United States Patent [19]
Kawamura

[11] Patent Number: 5,826,558
[45] Date of Patent: Oct. 27, 1998

[54] CONTROL UNIT FOR HIGH-COMPRESSION RATIO ENGINES USING VAPORIZING FUELS

[75] Inventor: Hideo Kawamura, Kanagawa, Japan

[73] Assignee: Isuzu Ceramics Research Institute Co., Ltd., Kanagawa, Japan

[21] Appl. No.: 781,043

[22] Filed: Jan. 9, 1997

Related U.S. Application Data

[63] Continuation of Ser. No. 695,706, Aug. 12, 1996, abandoned, which is a continuation of Ser. No. 541,450, Oct. 10, 1995, abandoned, which is a continuation of Ser. No. 150,805, Nov. 12, 1993, abandoned.

[30] Foreign Application Priority Data

Nov. 11, 1992 [JP] Japan .................................... 4-326056
Nov. 11, 1992 [JP] Japan .................................... 4-326057

[51] Int. Cl.$^6$ .................................................. F02B 19/02
[52] U.S. Cl. ............................................................ 123/292
[58] Field of Search .................................... 123/292, 270, 123/271, 272, 290, 569, 256

[56] References Cited

U.S. PATENT DOCUMENTS

| | | | |
|---|---|---|---|
| 3,911,878 | 10/1975 | Hofbauer et al. ........................ | 123/292 |
| 4,320,727 | 3/1982 | Artman .................................... | 123/290 |
| 4,372,264 | 2/1983 | Trucco .................................... | 123/255 |
| 4,644,926 | 2/1987 | Sakurai et al. ........................... | 123/569 |
| 4,744,341 | 5/1988 | Hareyama et al. ...................... | 123/256 |
| 5,065,714 | 11/1991 | Matsuoka ................................. | 123/254 |
| 5,178,109 | 1/1993 | Kawamura ............................... | 123/292 |
| 5,237,964 | 8/1993 | Tomulu .................................... | 123/25 C |

FOREIGN PATENT DOCUMENTS

| | | | |
|---|---|---|---|
| O-503973A1 | 9/1992 | European Pat. Off. ............... | 123/292 |
| O-503973B1 | 6/1995 | European Pat. Off. ............... | 123/292 |
| 2 342 399 | 9/1977 | France .................................... | 123/256 |

OTHER PUBLICATIONS

European Search Report dated Jun. 13, 1995.

*Primary Examiner*—Raymond A. Nelli
*Attorney, Agent, or Firm*—Staas & Halsey

[57] ABSTRACT

This invention to achieve efficient combustion of volatile fuels through the precise control of the opening/closing of a control valve installed in the path between the main and the subcombustion chambers installed to vaporize and ignite volatile fuels for combustion at high-compression ratios.

The control valve 5 is installed in the path 31 between the main combustion chamber 23 and the subcombustion chamber 3. The subcombustion chamber 3 with a heat-insulating structure, is equipped with the injection nozzle 6 and the spark plug 7. The controller 8 judges the load applied to the engine by verifying the signals which are input from the revolution sensor 81, the load sensor 82 and the crankshaft position sensor 83. If the load is applied to part of the engine, the control valve 5, which was opened at the initial stage of the expansion stroke, is closed at the final stage of expansion so that hot gases remain in the subcombustion chamber. If the load is applied to the entire engine, the control valve 5 is closed in the exhaust stroke to leave the gases with high exhaust pressure so that the fuel to be injected in the next cycle is vaporized and activated.

11 Claims, 6 Drawing Sheets

CONTROL UNIT FOR HIGH-COMPRESSION RATIO ENGINES USING VAPORIZING FUELS

This application is a continuation of application Ser. No. 08/695,706, filed Aug. 12, 1996, now abandoned, which is a continuation of Ser. No. 08/541,450, filed Oct. 10, 1995, now abandoned, which is a continuation of Ser. No. 08/150,805, filed Nov. 12, 1993, now abandoned.

BACKGROUND OF THE INVENTION

1. (Field of the Invention)

The present invention relates to the control unit for high-compression-ratio engines whereby volatile liquid fuel is burnt at high compression ratios.

2. (Description of the Prior Art)

It has been known that the heat efficiency of internal combustion engines is improved by increasing the fuel compression ratio. To improve the heat efficiency of the diesel engines using gas oil for fuel, the compression ratio is specified to around 20 and the fuel is injected into compressed air for combustion.

If volatile fuels such as gasolines or methanols are used for the cylinder injection as in the case of diesel engines, the fuels will vaporize before an appropriate air-fuel mixture can be generated. This results in insufficient mixture of air and vaporized fuel.

If air-fuel premix is inducted into the cylinder and compressed to a high degree, as in the case of normal gasoline engines, the increased temperature caused by compression will prematurely ignites the fuel, resulting in knocking. Therefore, it is difficult to increase the compression ratio to a level higher than the conventional one.

Accordingly, an object of the invention is to provide a control unit for the said engines which improves the combustion efficiency by providing a subcombustion chamber with a control valve to burn volatile fuels at high compression ratios, and by controlling the opening/closing of the control valve according to the engine load and the temperature of the subcombustion chamber.

SUMMARY OF THE INVENTION

To achieve the said goals, the present invention provides the control unit with a control valve which opens/closes the path between the main combustion chamber and the subcombustion chamber in which the precombustion takes place, the means for maintaining high temperature in the inner wall of the subcombustion chamber, an injection nozzle which injects volatile liquid fuel into the subcombustion chamber, a spark plug which is installed in the subcombustion chamber and ignites the injected fuel, and the means for controlling the opening/closing of the control valve, i.e. opening of the control valve at the initial stage of the expansion stroke according to the condition of the load applied to the engine, and closing of the control valve between the final stage of the expansion stroke and the beginning of the exhaust stroke.

The control valve is mounted on the path between the main chamber and the subcombustion chamber where the precombustion of volatile liquid fuels takes place. The fuel is injected into the subcombustion chamber with the control valve closed. The air-fuel mixture is activated by the temperature of the inner wall of the subcombustion chamber, so that self-ignition takes place by the temperature of the inner wall. If the temperature is low, the fuel is ignited by the spark plug.

If the part load is applied to the engine, the control valve is opened at the initial stage of the expansion stroke. When the control valve is closed at the final stage of expansion, the unburnt hot exhaust gases remain in the subcombustion chamber, whereby the injection fuel in the next cycle will be activated. If the load is applied to the entire engine, the control valve is closed in the exhaust stroke. The high exhaust pressure allows the hot exhaust gases to remaine in the subcombustion chamber, even when the control valve is closed. Thus, the injection fuel in the next cycle may be activated, resulting in a high-compression-ratio engine with highly efficient combustion.

DESCRIPTION OF THE PREFERRED EMBODIMENTS

An embodiment of the present invention will be explained herebelow in detail with reference to the drawings.

Figure 1:
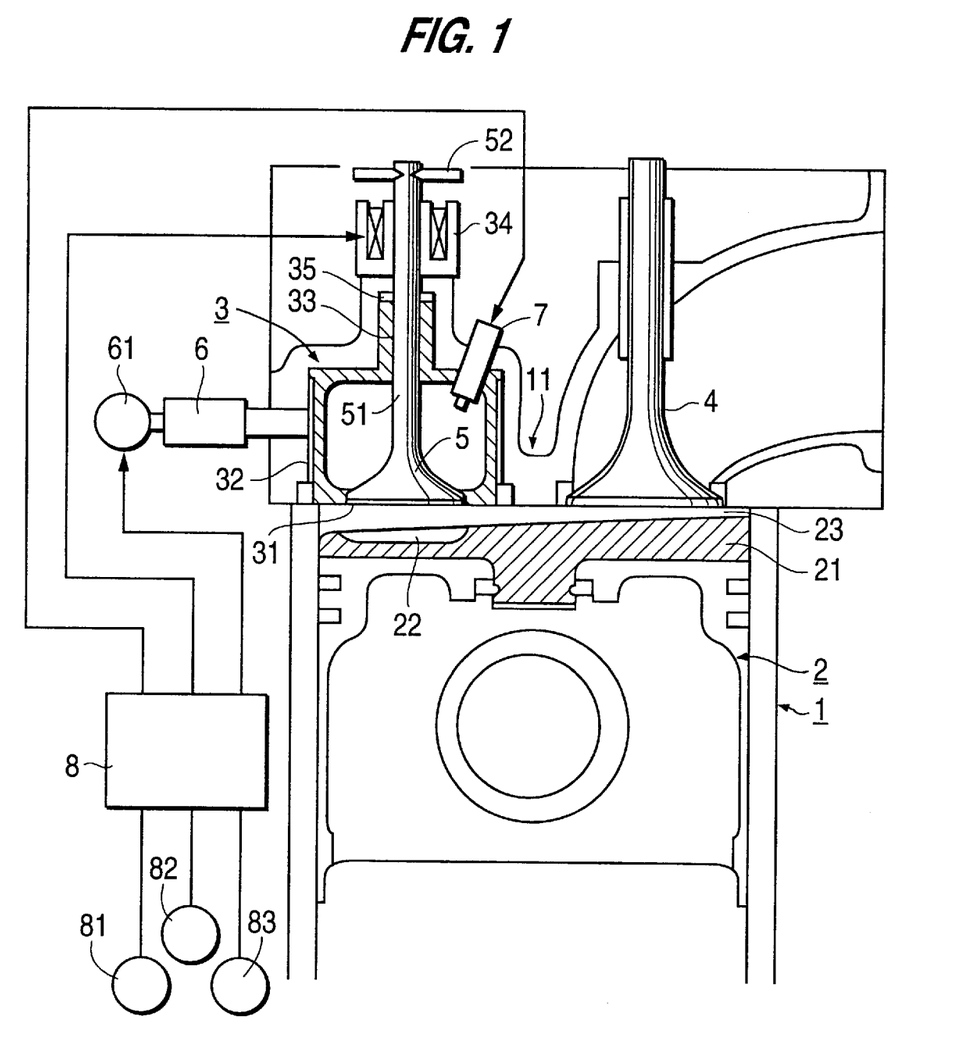
FIG. 1 is a block diagram showing an example of configuration of the control unit of the high-compression-ratio engines using vaporizing fuel related to the present invention.

FIG. 1 is a block diagram showing a configuration example of high-compression-ratio engines using vaporizing fuels according to the invention.

In FIG. 1, the cylinder 1 is equipped with the piston 2 that freely slides in the vertical direction. The cylinder head 11 has the subcombustion chamber 3, which is used as a precombustion chamber for volatile petrol and methanol, and intake and exhaust valves 4. The piston head 21 uses ceramics with high strength and heat resistance. The top of the piston head is formed into a low slant at subcombustion chamber side. The portion corresponding the path 31 to the subcombustion chamber 3 has the hollow 22 to serve as an air reservoir, which together with the upper gap of the piston 2 forms the main combustion chamber 23.

The subcombustion chamber 3 is made of ceramics with high strength, heat resistance and high thermal insulation, as with, for example, silicon nitride. The air layer 32 for heat insulation is formed around the outer wall of the subcombustion chamber. The center of the subcombustion chamber is equipped with the control valve 5 that opens/closes the path 31 by moving vertically. The stem 51 of the control valve 5 is supported by the shaft hole 33 in the upper wall of the subcombustion chamber. The adsorption plate 52 installed on the top of the stem opens/closes the path 31 by its suction force through control of power supply to the electromagnetic mechanism 34 located in the upper portion of the subcombustion chamber 3. The heat insulator 35 is installed between the subcombustion chamber 3 and the electromagnetic mechanism 34.

The injection nozzle 6 is installed to the side wall of the subcombustion chamber 3 to inject the volatile fuel from the injection pump 61 to the subcombustion chamber. The spark plug 7 ignites the fuel by spark discharge, which is used when ignition is difficult because of the condition of the engine load or low temperature of the inner wall of the subcombustion chamber 3.

The controller 8 consists of a microcomputer. The controller performs the specified operation when the detection signals are input from the revolution sensor 81, the load sensor 82 and the crankshaft position sensor 83 of the engine. Then, operation instructions are issued to the electromagnetic mechanism 34, the injection pump or the spark plug 7 according to the map and the control procedure stored in the controller.

Figure 2:
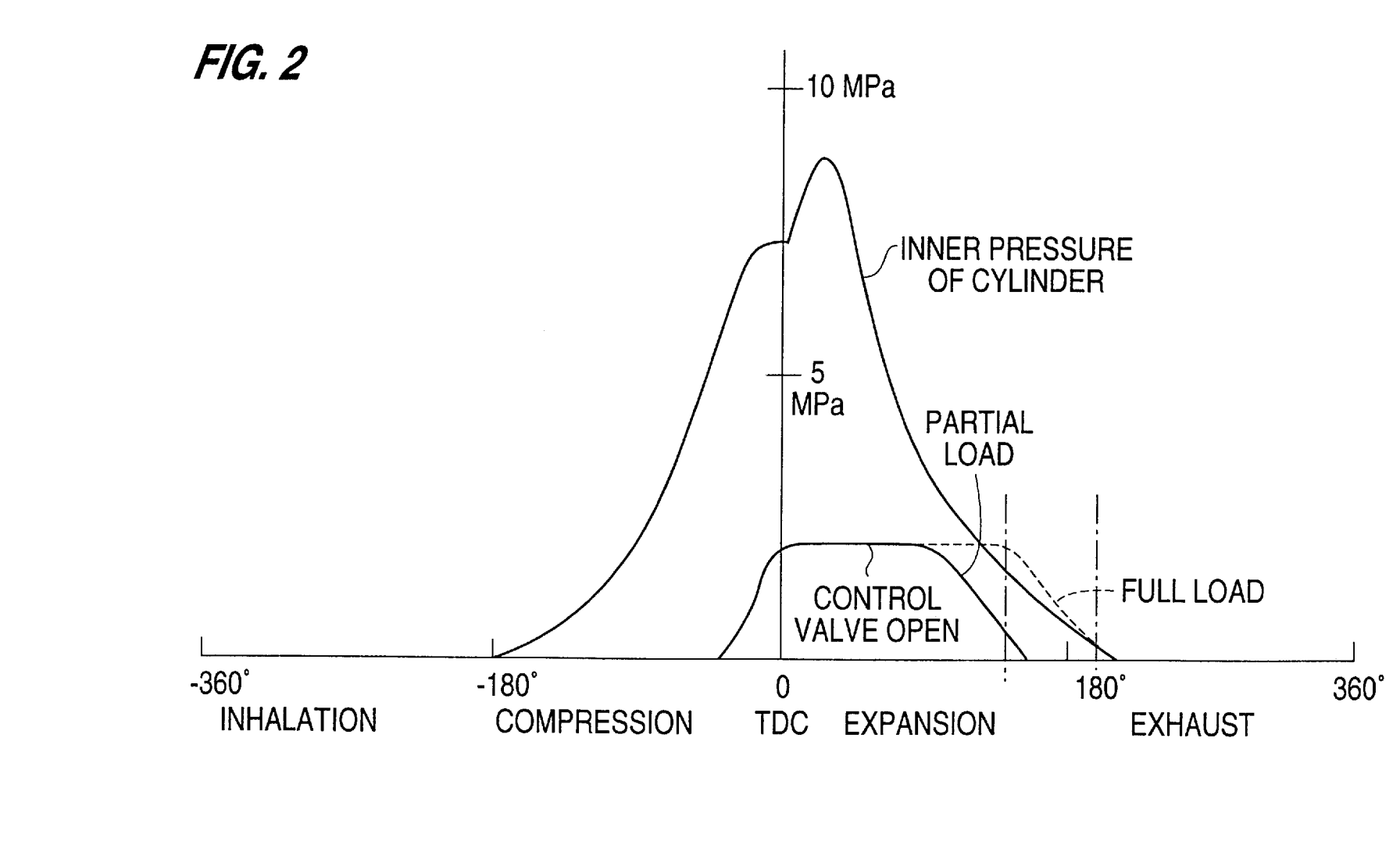
FIG. 2 is a curve diagram showing the relation between the crank angle employed in the first embodiment and opening/closing of the control valve.
Figure 3:
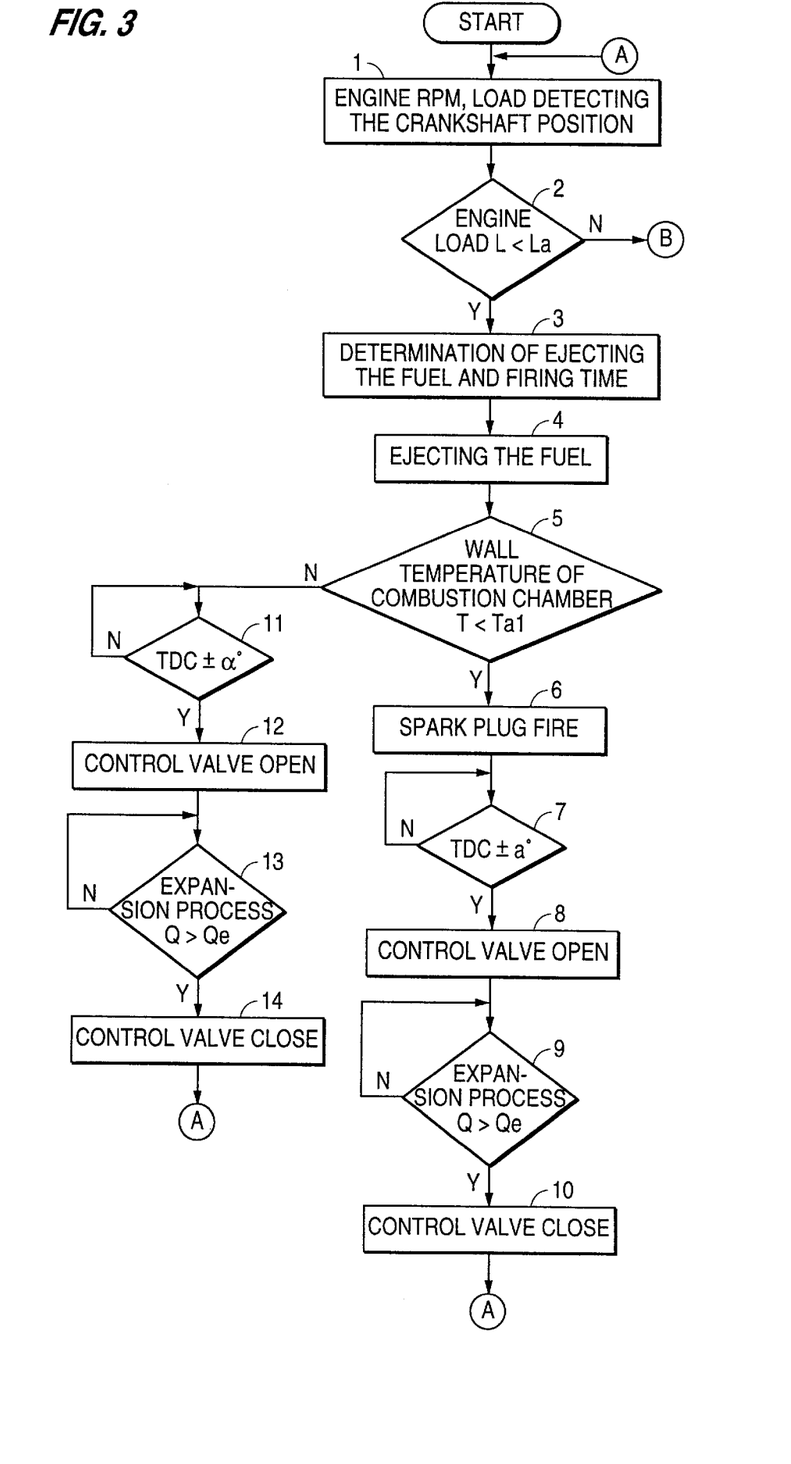
FIG. 3 is a flowchart showing an example of operations performed by the first embodiment.
Figure 4:
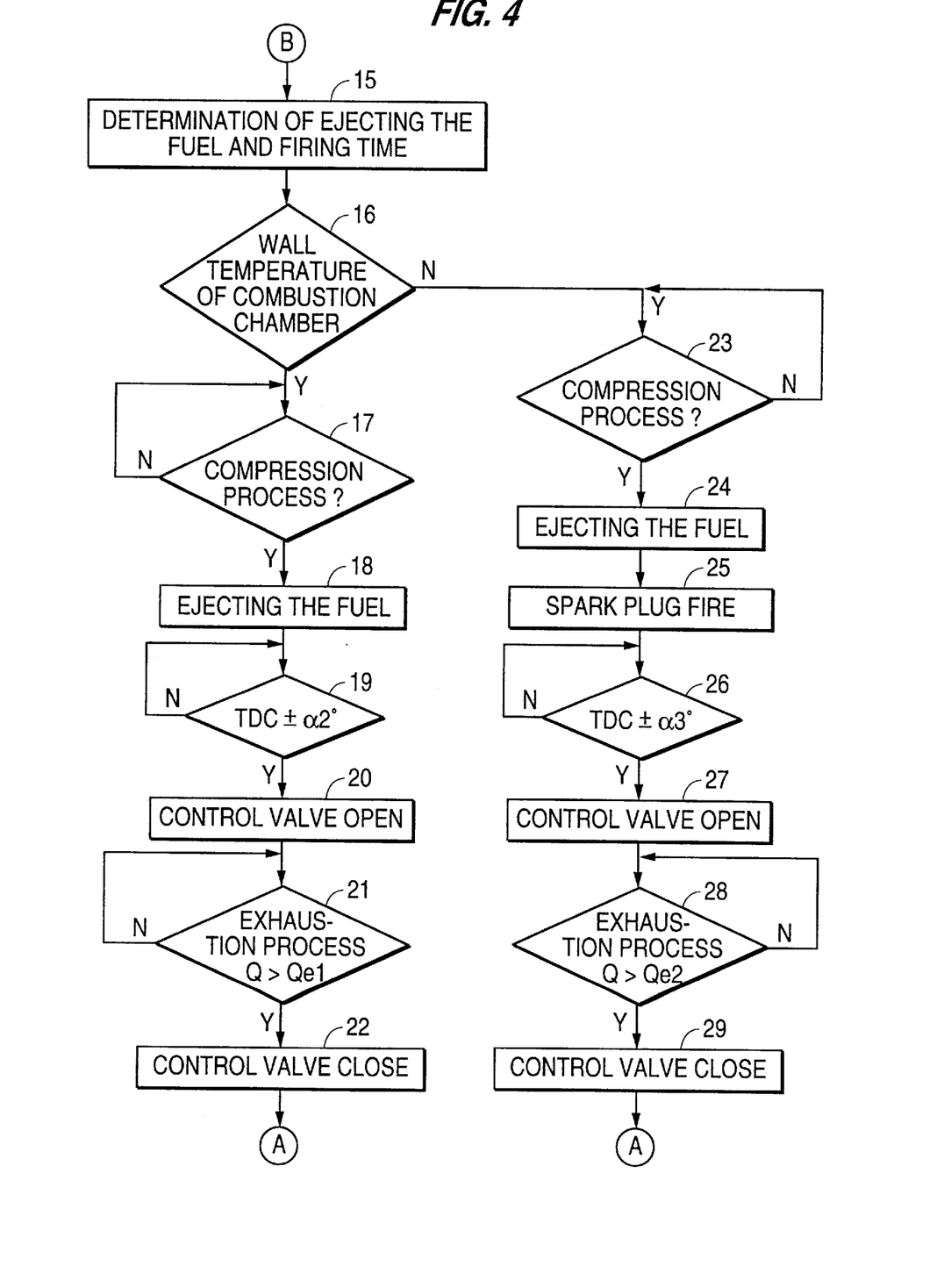
FIG. 4 is a flowchart showing an example of operations performed by the first embodiment.

FIG. 2 is a curve diagram showing the relation between the crank angle employed in the embodiment and the opening/closing of the control valve. FIG. 3 and 4 are flowcharts showing an example of the operations of the embodiment. The operations of the embodiment will be explained herebelow in detail with reference to these drawings.

In step 1 in FIG. 3, the engine revolution signal from the revolution sensor 81, the engine load signal from the load sensor 82 and the position signal from the crankshaft position sensor 83 are input to the controller, respectively. The controller verifies these signals and proceed to step 3 if it detects that the load is applied to part of the engine at step 2. If the load is larger than the specified load La, the controller goes to step 15 in FIG. 4.

In step 3, fuel injection and the ignition timing are determined, based on the map stored in the controller. Then, the controller proceeds to step 4 to inject fuel from the injection nozzle 6.

If the controller detects that the temperature of the inner wall of the subcombustion chamber 3 is lower than the specified temperature Ta1 in step 5, it proceeds to step 6 and performs ignition by using the spark plug 7 to start combustion in the subcombustion chamber. In step 7, the controller opens the control valve 4 by using the electromagnetic mechanism 34 at the point when the crank angle in the compression stroke reaches $\alpha°$ (BTDC 30° to 0°) near the top dead center. Then, air is supplied from the main combustion chamber in the compression stroke for combustion, and blown into the main combustion chamber (step 8). If the crank angle in the expansion stroke reaches $\theta e$ (BBDC 30° to ABDC 20°), the control valve 4, which was open, will be closed, and the engine will be operated over the period from the expansion to exhaust strokes (steps 9 and 10).

If the temperature of the inner wall of the subcombustion chamber 3 is too high in the said step 5, the controller goes to step 11. In such a case, the high temperature causes self-ignition in the subcombustion chamber. The same operations (steps 12 to 14) as in the subsequent steps of the said step 8 will be performed by opening the control valve 4 when the crank angle reaches $\alpha°$ near the top dead center.

If the load applied to the engine is large, and as a result, the controller proceeds to step 15 shown in FIG. 4, fuel injection and the ignition timing are determined according to that engine load. Then, in step 16, the temperature of the inner wall of the subcombustion chamber 3 is verified. If the temperature exceeds the specified temperature Ta2, the controller proceeds to step 17. In the case of the compression stroke, the fuel is injected from the injection nozzle 6 to be ignited by the temperature of the inner wall (step 18).

In step 19, the power is supplied to the electromagnetic mechanism 34 to open the control valve 5 at the point when the crankshaft angle reaches the specified angle of $\alpha 2°$ near the top dead center. Then, the control valve 5 is closed at the specified angle of $\theta e1$ in the exhaust stroke (steps 20 to 22). As shown in FIG. 2, the closing timing of the control valve in step 19 is specified as delayed from the closing timing when the engine is partially loaded.

If the wall temperature of the subcombustion chamber 3 is low in step 16, the controller proceeds to steps 23 and then to 24 to perform injection of the fuel. Since self-ignition does not take place in low wall temperature, the fuel is ignited by using the spark plug 7 in step 25.

In step 27, the control valve 5 is opened at the point when the crankshaft angle reaches $\alpha 3°$ which is delayed from the timing specified at $\alpha 2°$ in the said step 19. In step 28, the control valve 5 is closed at the point when the crank angle reaches the specified angle of $\theta e2$ in the exhaust stroke, and thus the operation of the engine will be continued.

As set forth, according to the present invention, the subcombustion chamber where the precombustion of volatile fuel takes place has a heat-insulating structure so that the temperature of the inner wall of the subcombustion chamber increases. In addition, the control valve is installed to the path between the main and subcombustion chambers. The fuel is injected into the subcombustion chamber with the control valve closed, and the fuel is ignited through self-ignition using the temperature of the inner wall, or by using the spark plug if the temperature is low. The air-fuel mixture ignited in the subcombustion chamber is blown into the main combustion chamber for combustion by opening the control valve at the specified angle around the top dead center according to the load applied to the engine. In addition, the control valve opened at the initial stage of the expansion stroke is closed at the final stage of expansion to accumulate unburnt hot gases in the subcombustion chamber when the load is applied to part of the engine, so that the fuel for the next injection cycle will be vaporized and activated. The control valve is closed in the exhaust stroke when the load is applied to the entire engine. Since the exhaust pressure is high, hot exhaust gases remain in the subcombustion chamber even when the control valve is closed. As a result, the fuel in the next injection is vaporized and activated with high efficiency. Therefore, volatile liquid fuel can be burn with high efficiency at high compression ratios, without causing premature ignition or knocking.

Figure 5:
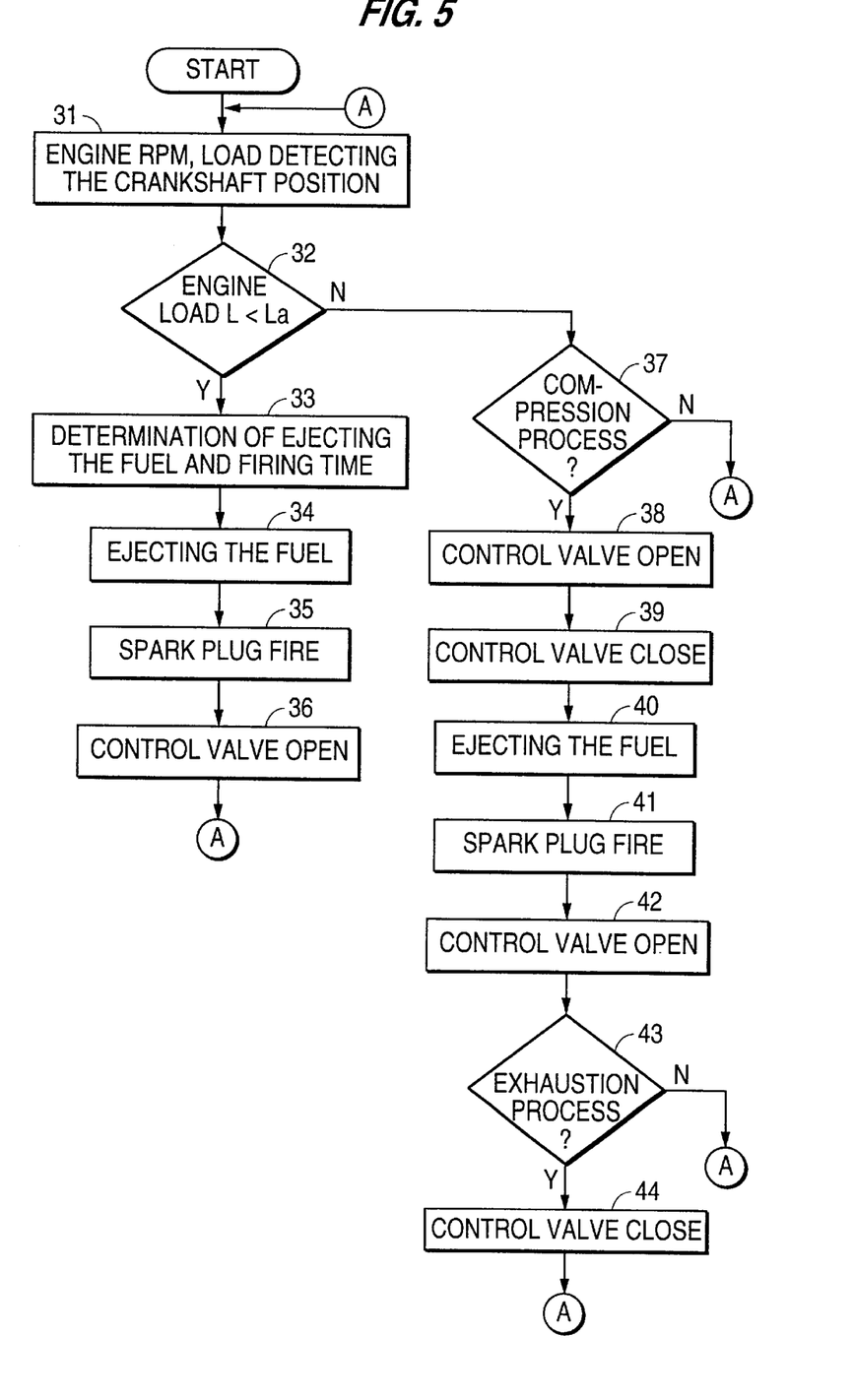
FIG. 5 is a flowchart showing an example of operations performed by the second embodiment.

FIG. 5 is a flow chart of the second embodiment.

In step 31 in FIG. 5, the number of rotation of engine, the engine load, and the crankshaft positioned of the detection signals are inputed from the revolution sensor, load sensor 82 and crankshaft positioned sensor 83. After this, the engine load which is input in step 32 is checked.

If it detects that the input engine load is smaller that the specified load La, it proceeds to step 33 and fuel injection and the ignition timing are determined.

In step 34, the controller ignites fuel at the determined time. In step 35, the spark plug 7 ignites the fuel by spark disc and then power is supplied to the electromagnetic mechanism 34 to open the control valve 5 near the top dead center. In this case, the engine load is small and generates plenty of surplus air. The combustion of air-fule mixture by ignition makes the pressure in the subcombustion chamber high and also makes it possible to open the electromagnetic mechanism 34 even when the electromagnetic power is small.

Figure 6:
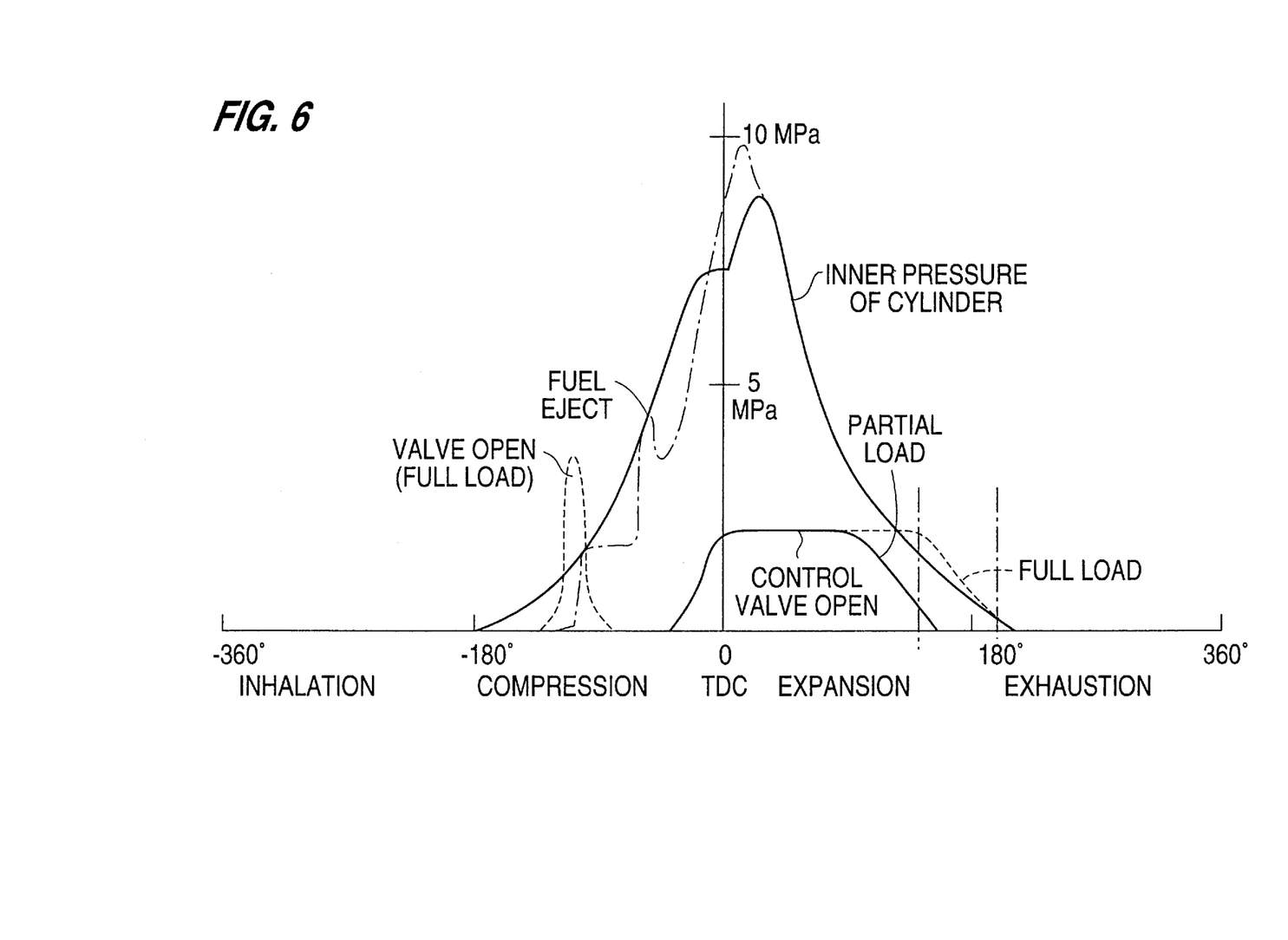
FIG. 6 is a curve diagram showing the relation between the crank angle employed in the second embodiment and opening/closing of the control valve.

If the load applied to the engine is large in the said step 32, the controller proceed to step 37 and is verified if it is the compression stroke. In the case of compression stroke, the controller goes to step 38. As shown in FIG. 6, after the control valve is opend at the specified timing of the compression stroke, it is closed immediately in step 39 and fuel injection is performed. Then, ignition by using the spark plug 7 and the control valve is opened near the top dead center. (step 40 to 42) In this case, by opening the control valve in the compression stroke, a large quantity of air is flows into the subcombustion chamber from the main combustion chamber. The mixture of air and sparked fuel makes it active and by igniting this, the puressure in the subcombustion chamber is increased to make it easy to open the controll valve 5.

In step 33, the check is performed to verify if it is the exhaust stroke, and in the case of exhaust stroke, it closes the control valave 5 and go back to the first flow.

A curve diagram in FIG. 6 shows the puressure in the subcombustion chamber from the compression storke to exhast stroke.

The ignition is well performed even with the high compression ratio. And when the load is high, the pressure in the subcombustion is increased by introducing air into the subcombustion through the open/close of the control valve and igniting fuel with the injection. As a result, the difference in pressure between the main combustion and the subcombustion chamber is decreased. Therefore even with the small driving force, the control valve can be opened.

What I claim is:

1. A control unit for high-compression-ratio engines using vaporizing fuels comprising:
   a control valve which opens and closes a path between a main combustion chamber and a subcombustion chamber in which precombustion takes place;
   means for maintaining high temperature in the inner wall of the subcombustion chamber;
   an injection nozzle which injects volatile liquid fuel into the subcombustion chamber;
   a spark plug which is installed in the subcombustion chamber and ignites the injected fuel; and
   control means for opening and closing of the control valve said control means controlling the control valve to open at the initial stage of the expansion stroke according to die condition of the load applied to the engine, and to close between die final stage of the expansion stoke and the beginning of the exhaust stroke.

2. A control unit for high-compression-ratio engines using vaporizing fuels according to claim 1, further comprising:
   means for closing the control valve at the final stage of the expansion stroke if the load is applied to part of the engine, and at the beginning of the exhaust stroke if the load is applied to the entire engine.

3. A control unit for high-compression-ratio engines using vaporizing fuels according to claim 1, further comprising:
   means for controlling the spark plug based on the relation between the engine load and the temperature of the inner wall of the subcombustion chamber.

4. A control unit for high-compression-ratio engines using vaporizing fuels comprising:
   a path between a main combustion chamber and a subcombustion chamber;
   a control valve which opens and closes said path between said main combustion chamber and said subcombustion chamber;
   a control valve driving mechanism for operating said control valve; and
   means for operating and controlling the opening and closing of said control valve in the combustion stroke according to the load applied to the engine.

5. A control unit for high-compression-ratio engines using vaporizing fuels according to claim 4, wherein said valve operating means is an electromagnetic mechanism for operating the valve by imparting an electromagnetic force.

6. A control unit for high-compression-ration internal combustion engines using vaporizing fuels, comprising:
   means for detecting engine load;
   a control valve for opening and closing a path between a main combustion chamber and a subcombustion chamber;
   means for operating said control valve in response to the engine load, said means for operating said control valve closing the path by said control valve during the expansion stroke when a low load is detected and closing the path by said control valve during the exhaust stroke when a high load is detected.

7. The control unit of claim 6, further comprising:
   means for detecting the temperature of the subcombustion chamber;
   a spark plug, installed in the subcombustion chamber;
   means for controlling said spark plug in response to the temperature of the subcombustion chamber such that: when a temperature lower than the fuel flash point is detected, a spark is emitted by said spark plug, and when a temperature higher than the fuel flash point is detected, no spark is emitted.

8. A high compression-ratio internal combustion engine using vaporizing fuels, comprising:
   a main combustion chamber;
   a subcombustion chamber, having an inner wall, for precombustion of the fuel;
   means for injecting vaporizing fuel into said subcombustion chamber;
   means for maintaining the temperature of the inner wall of said subcombustion chamber;
   means for detecting engine load;
   a control valve for opening and closing the path between said main chamber and said subcombustion chamber;
   means for operating said control valve in response to the engine load, said means for operating said control valve closing the path by said control valve during the expansion stroke when a low load is detected and closing the path by said control valve during the exhaust stroke when a high load is detected.

9. The high-compression-ratio engine of claim 8, further comprising:
   means for detecting the temperature of said subcombustion chamber;
   a spark plug, installed in said subcombustion chamber;
   means for controlling said spark plug in response to the temperature of the subcombustion chamber such that: when a temperature lower than the fuel flash point is detected, a spark is provided by said spark plug, and when a temperature higher than the fuel flash point is detected, no spark is provided.

10. The high-compression-ratio engine of claim 8, wherein said means for operating said control valve comprises:
    an electromagnetic drive unit for opening and closing said control valve by applying an electromagnetic force.

11. A control unit for high-compression-ratio engines using vaporizing fuels comprising:
    a control valve which opens and closes a path between a main combustion chamber and a subcombustion chamber in which precombustion takes place;

means for maintaining high temperature in the inner wall of the subcombustion chamber;

an injection nozzle which injects volatile liquid fuel into the subcombustion chamber;

a spark plug which is installed in the subcombustion chamber and ignites the injected fuel; and means for controlling opening and closing of the control valve, said means for controlling opening and closing of the control valve opening the control valve at an initial stage of the expansion stroke according to the condition of the load applied to the engine, closing the control valve between a final stage of the expansion stroke and a beginning of the exhaust stroke, and preventing air flow through the subcombustion chamber during the exhaust stroke, wherein:

if the load applied to the engine is small, the control valve is released only during the expansion stroke, and if a maximum load is applied to the engine, the control valve is released until the exhaust stroke based upon high temperature gas remaining until the exhaust stroke, providing the high temperature gas with low pressure inside of the subcombustion chamber for fuel vaporization and ignition.

* * * * *